US008542737B2

(12) United States Patent
Dvir et al.

(10) Patent No.: US 8,542,737 B2
(45) Date of Patent: Sep. 24, 2013

(54) INTRA VIDEO IMAGE COMPRESSION AND DECOMPRESSION

(75) Inventors: Ira Dvir, Rishon-LeZion (IL); Nitzan Rabinowitz, Ramat-HaSharon (IL)

(73) Assignee: Human Monitoring Ltd., Givat HaShlosha (IL)

( * ) Notice: Subject to any disclaimer, the term of this patent is extended or adjusted under 35 U.S.C. 154(b) by 391 days.

(21) Appl. No.: 12/728,224

(22) Filed: Mar. 21, 2010

(65) Prior Publication Data

US 2011/0228848 A1 Sep. 22, 2011

(51) Int. Cl.
 *H04N 7/12* (2006.01)
(52) U.S. Cl.
 USPC ............... 375/240.12; 375/E7.79; 375/E7.26; 382/232; 382/100
(58) Field of Classification Search
 USPC ................ 382/263, 239, 236, 232, 234, 154, 382/164, 233; 375/E7.093, E7.094, E72.11, 375/240.01–240.26, E7.76, E7.26; 348/42, 348/43, 47, 384.1, 397.1, 402.1, 407.1, 409.1, 348/413.1, 416.1, 420.1, 46, 5
 See application file for complete search history.

(56) References Cited

U.S. PATENT DOCUMENTS

| 5,920,353 | A  | * | 7/1999  | Diaz et al. ............... 375/240.15 |
| 6,028,635 | A  | * | 2/2000  | Owen et al. ............. 375/240.18 |
| 6,668,019 | B1 | * | 12/2003 | Owen et al. ............. 375/240.14 |
| 7,983,493 | B2 | * | 7/2011  | Zhang .......................... 382/232 |
| 2004/0126021 | A1 | * | 7/2004 | Sull et al. ...................... 382/233 |
| 2004/0131267 | A1 |   | 7/2004 | Adiletta et al. |
| 2005/0265640 | A1 |   | 12/2005 | Bilsing |
| 2006/0256852 | A1 |   | 11/2006 | Prakash et al. |
| 2009/0285302 | A1 | * | 11/2009 | Kato et al. ............... 375/240.16 |
| 2010/0195715 | A1 | * | 8/2010 | Liu et al. ................... 375/240.02 |
| 2010/0226438 | A1 | * | 9/2010 | Saunders et al. ......... 375/240.16 |

OTHER PUBLICATIONS

International Search Report and the Written Opinion Dated Aug. 11, 2011 From the International Searching Authority Re: Application No. PCT/IL11/00267.

* cited by examiner

*Primary Examiner* — Mekonen Bekele

(57) ABSTRACT

A method for compressing an image having rows and columns, comprising providing an image, sub-sampling the image into a plurality of sub-image by selecting subsets of non-overlapping pixels in neighboring rows and columns in the image and encoding the sub-images in a video sequence.

48 Claims, 11 Drawing Sheets

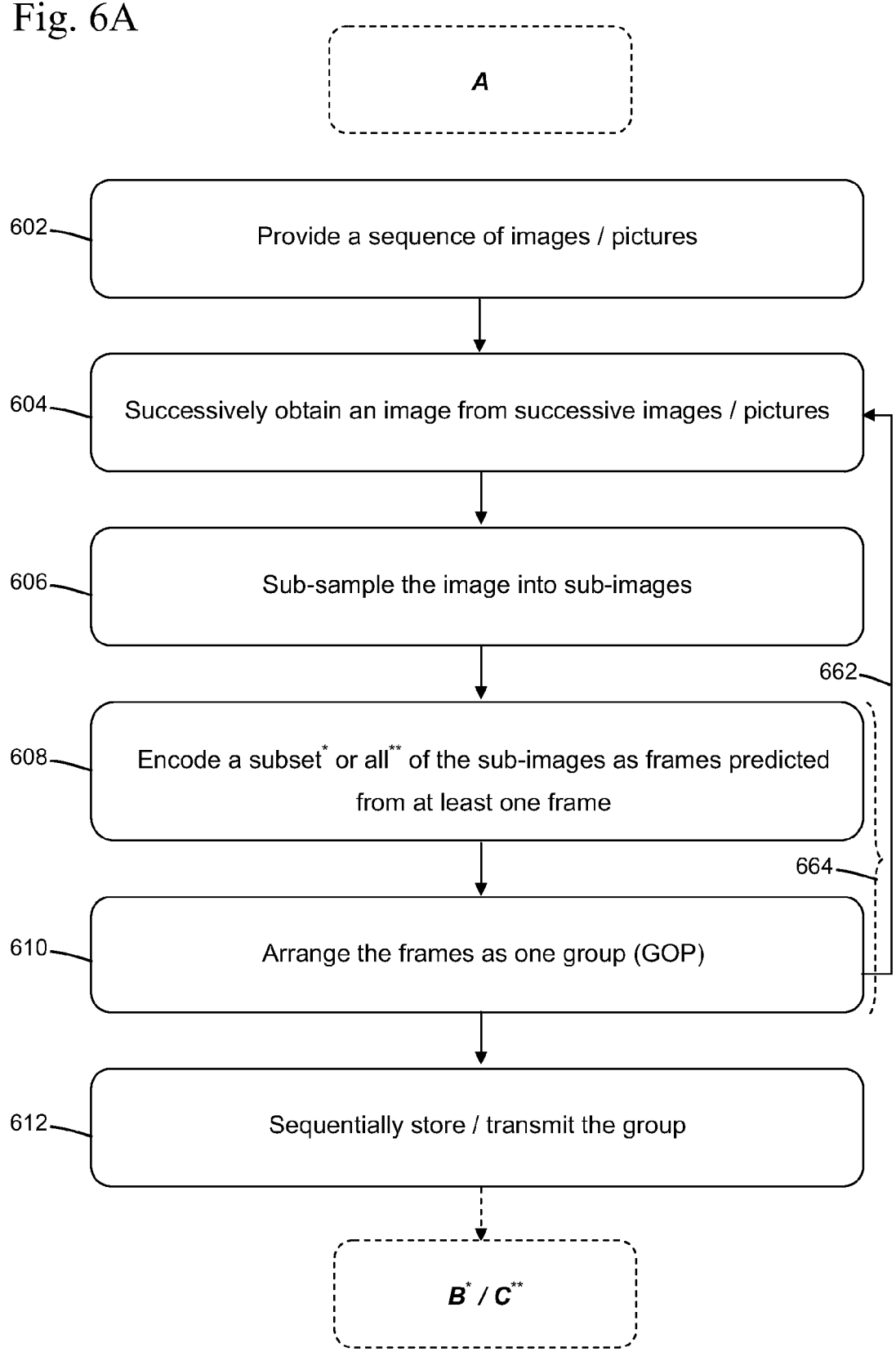

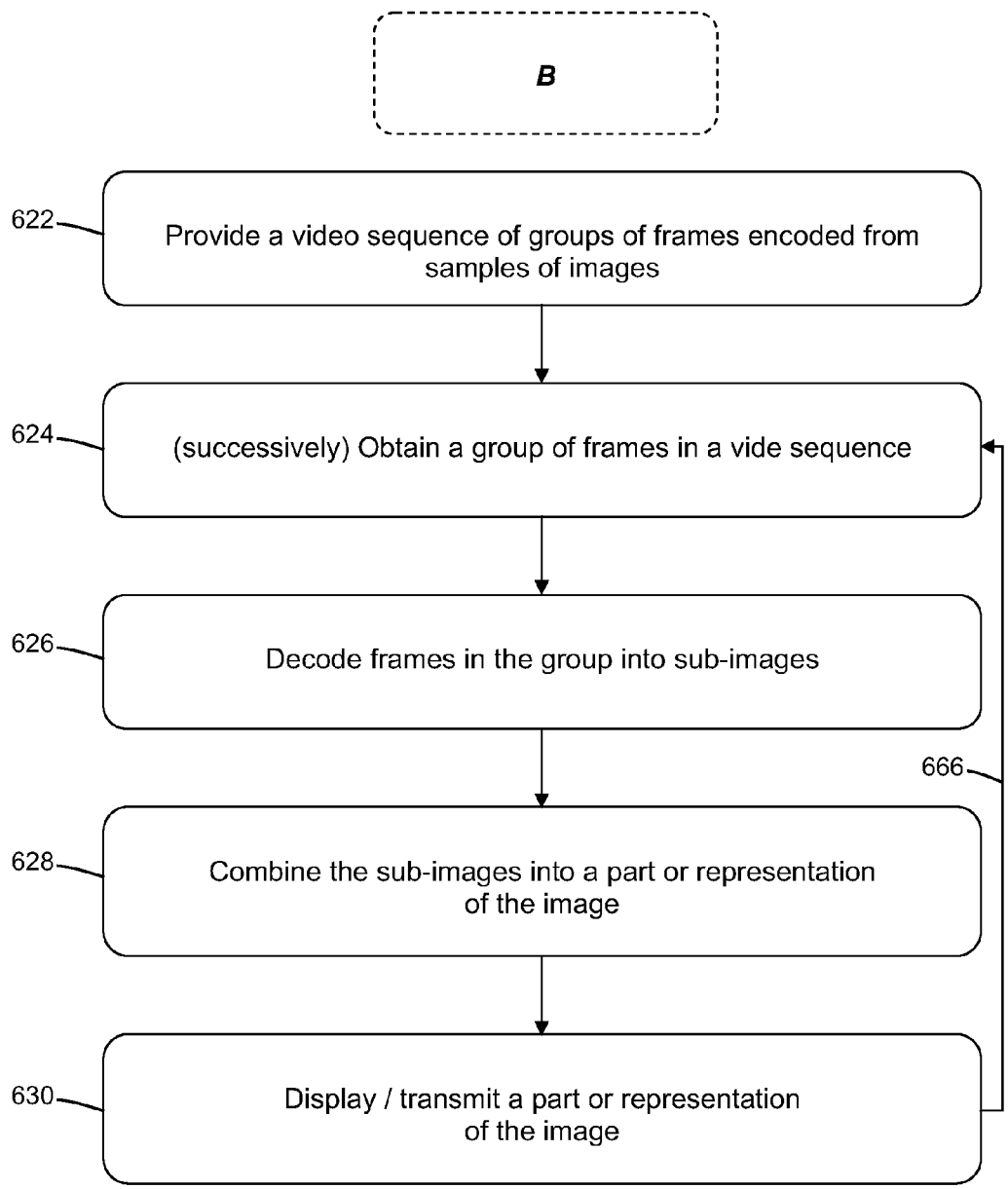

INTRA VIDEO IMAGE COMPRESSION AND DECOMPRESSION

FIELD AND BACKGROUND OF THE INVENTION

The present invention, in some embodiments thereof, relates to image compression and/or reconstruction and, more particularly, but not exclusively, to image compression in a video.

Over the last years, both video and still image frame achieved high definitions in commercial products. Resolutions of 2, 4 and 8 million pixels per frame are already common in the video industry, whereas resolutions of 16 and even more million pixels per bitmap are already common in the camera market, and cellular handset devices with 8 and 12 million pixels are already marketed.

Various applications, like still image compression and frame-accurate video editing call for coding of independent bitmaps. Coding of such bitmaps poses some difficulties in terms of compression efficiency, progressive transmission, and previewing efficiency. Additionally, stereoscopic imaging is becoming a notable medium as televisions sets capable of 3D viewing are introduced, as are movies such as the notorious Avatar film, generally doubling the volume of image data.

Contemporary techniques typically apply DCT, Wavelet, near-block spatial prediction, and optimized quantization tables, and the results are well known and documented in numerous researches and articles.

In some cases fast de-compression of high resolution frames is important to video editing, where an editor needs to be able to view real time presentation, while the widely used production codecs (e.g. DNxHD of Avid Technology, Inc, and Panasonic's AVC-Intra)) typically do not have any reduced resolution and/or reduced quality presentation ability to present the frames, and others (e.g. ProRes422/444 of Apple, Inc), have a reduced presentation ability at reduced quality, which in many cases are deemed as not satisfactorily efficient.

Using video to compress images is disclosed, for example, in US patent application publication US2008/0159639 that discloses a method for compressing high resolution images as low resolution video, or the US2008/8165843 patent application publication which discloses a hardware architecture for compressing images in a video, where the above cited applications share common inventors as the present application.

SUMMARY OF THE INVENTION

According to an aspect of some embodiments of the present invention there is provided a method for compressing an image, optionally as part of a stream of compressed images, optionally based on self-similarity thereof and/or as a plurality of interrelated sub-samples of the image in frames of a video or quasi-video sequence such as in a file or a transmission stream (hereinafter 'video' or 'video sequence').

According to an aspect of some embodiments of the present invention there is provided a method for compressing an image, comprising:

(a) providing an image having a plurality of at least approximately redundant pixels;

(b) selecting one or more subsets of non-overlapping pixels from the at least approximately redundant pixels, yielding one or more sub-images of the image; and (c) encoding at least a subset of the sub-images in a video sequence as frames predicted from at least one frame.

In some embodiments, selecting one or more subsets of non-overlapping pixels totals to selecting the pixels of the entire image.

In some embodiments, one or more sub-images comprises a plurality of sub-images.

In some embodiments, a subset of the sub-images comprises all the sub-images.

In some embodiments, wherein predicted from at least one frame comprises predicted from at least an Intra-Frame.

In some embodiments, predicted from at least one frame comprises predicted from one frame.

In some embodiments, predicted from at least one frame comprises predicted from one frame.

In some embodiments, encoding the sub-images in a video sequence comprises encoding the sub-images in an independent group of frames independently of other images that are included or subsequently or potentially included in the sequence.

In some embodiments, the video sequence is structured according to a video structure used in the art.

In some embodiments, encoding sub-images in a video sequence comprises using an existing video encoder or codec.

In some embodiments, encoding the sub-images in a video sequence comprises encoding the sub-images in an independent group of frames, allowing the image to be restored, at least partially, by decoding frames corresponding to the sub-images of the image, irrespective of other images that are included or subsequently included in the sequence.

In some embodiments, encoding the sub-images in a video sequence comprises encoding the sub-images in an independent group of frames, allowing a reduced form of the image to be restored by decoding one frame corresponding a sub-image of the image, irrespective of other images that are included or subsequently included in the sequence.

In some embodiments, encoding the sub-images in a video sequence comprises encoding the sub-images in an independent group of frames, allowing decoding the frames by an existing decoder or codec.

According to an aspect of some embodiments of the present invention there is provided method for compressing an image having rows and columns, comprising:

(a) providing an image;

(b) sub-sampling the image into one or more sub-images by selecting or ore more subset of non-overlapping pixels in neighboring rows and columns in the image; and (c) encoding at least a subset of the sub-images of the image in a video sequence as frames predicted from at least one frame.

In some embodiments, one or more subsets of non-overlapping pixels totals to selecting the pixels of the entire image.

In some embodiments, one or more sub-images comprises a plurality of sub-images.

In some embodiments, a subset of the sub-images comprises all the sub-images.

In some embodiments, predicted from at least one frame comprises predicted from at least an Intra-Frame.

In some embodiments, predicted from at least one frame comprises predicted from one frame.

In some embodiments, encoding the sub-images in a video sequence comprises encoding sub-images in an independent group of frames independently of other images that are included or subsequently or potentially included in the sequence.

In some embodiments, sub-sampling comprises selecting each $n^{th}$ pixel in each $n^{th}$ row, where n is an integer such that n−1 is an integral factor of the number of rows and columns.

In some embodiments, sub-sampling comprises selecting each $k^{th}$ pixel in each $m^{th}$ row, where m and k are integers such that m−1 and k−1 are integral factor of the number of rows and columns, respectively.

In some embodiments, the video sequence is structured according to a video structure used in the art.

In some embodiments, encoding the sub-images in a video sequence comprises using an existing encoder or codec.

In some embodiments, encoding the sub-images in a video sequence comprises encoding the sub-images in an independent group of frames, allowing the image to be restored the frames corresponding to the sub-images of the image, irrespective of other images that are included or subsequently included in the sequence.

In some embodiments, encoding the sub-images in a video sequence comprises encoding the sub-images in an independent group of frames, allowing the image to be restored progressively by successively decoding frames corresponding to the sub-images of the image, irrespective of other images that are included or subsequently included in the sequence.

In some embodiments, encoding the sub-images in a video sequence comprises encoding the sub-images in an independent group of frames, allowing a portion of the image to be restored by decoding a subset of the frames corresponding to the sub-images of the image, irrespective of other images that are included or subsequently included in the sequence.

In some embodiments, encoding the sub-images in a video sequence comprises encoding the sub-images in an independent group of frames, allowing a portion of the image to be restored by decoding one of the frames corresponding to the sub-images of the image, irrespective of other images that are included or subsequently included in the sequence.

In some embodiments, encoding the sub-images in a video sequence comprises encoding the sub-images in an independent group of frames, allowing decoding the frames by an existing decoder or codec.

According to an aspect of some embodiments of the present invention there is provided a method for compressing a plurality of images having a relative large similar portions therebetween, comprising:

(a) providing the plurality of images;
(b) selecting subsets of non-overlapping corresponding pixels in the plurality of images, yielding a plurality of sub-images of the plurality of images; and
(c) encoding the sub-images in a video sequence as frames predicted from at least one frame.

In some embodiments, predicted from at least one frame comprises predicted from one frame.

In some embodiments, selecting subsets of non-overlapping corresponding pixels in the plurality of images totals to selecting the pixels of the entire images.

In some embodiments, encoding the sub-images in a video sequence comprises encoding the sub-images in an independent group of frames, independently of other images that are included or subsequently or potentially included in the sequence.

In some embodiments, encoding the sub-images in a video sequence comprises encoding sub-images selected from one or more of the plurality of images in an independent group of frames, independently of other images that are included or subsequently or potentially included in the sequence.

In some embodiments, encoding the sub-images in a video sequence comprises encoding the sub-images selected from each image in an independent group of frames, independently of other images that are included or subsequently or potentially included in the sequence.

In some embodiments, the video sequence conforms to a video structure used in the art.

In some embodiments, encoding sub-images in a video sequence comprises using an existing encoder or codec.

In some embodiments, encoding sub-images selected from the plurality of images in a video sequence is such that the images can be restored, at least partially, by decoding frames corresponding to the sub-images of the plurality of images, irrespective of other images that are included or subsequently included in the sequence.

In some embodiments, decoding the frames comprises using an existing decoder or codec.

In some embodiments, the plurality of images comprises at least one pair of images of stereoscopic presentation of a scene.

According to an aspect of some embodiments of the present invention there is provided a method for compressing a series of images, comprising:

(a) providing a series of images;
(b) sub-sampling each successive image in the series into a plurality of sub-images; and
(c) encoding in a video sequence the sub-images of each successive image in corresponding successive groups of frames predicted from at least one frame.

In some embodiments, wherein the video sequence is structured according to a video structure used in the art.

In some embodiments, wherein encoding comprises using an existing encoder or codec.

In some embodiments, encoding wherein encoding the sub-images in a video sequence comprises encoding the sub-images in independent group of frames, allowing the images to be restored, at least partially, by decoding frames in a group corresponding to the image.

According to an aspect of some embodiments of the present invention there is provided an apparatus for compressing and decompressing an image, comprising:

(a) a splitter configured to sub-sample an image into a plurality of sub-images comprising subsets of non-overlapping pixels of the image; and
(b) an encoder configured to encode the sub-images in a video sequence as frames predicted from at least one frame;
(c) a decoder configured to decode the encoded frames thereby restoring the sub-images, at least partially; and
(d) an assembler configured to combine the sub-images to construct the image, at least partially.

In some embodiments, the splitter is coupled to the encoder.

In some embodiments, the assembler is coupled to the decoder.

In some embodiments, encoding comprises encoding according to a video structure used in the art.

In some embodiments, configured comprises at least one of electronic circuitry or a program executable by a processor.

In some embodiments, at least one of the encoder or decoder are existing apparatus of the art.

According to an aspect of some embodiments of the present invention there is provided a method for decompressing an image encoded by sub-samples of non-overlapping pixels thereof in a group of frames in a video sequence, comprising:

(a) decoding at least a subset of the frames in the group into at least a subset of the sub-images;
(b) combining the sub-images to construct the image or part thereof;

In some embodiments, the subset of the frames comprises all the frames in the group.

In some embodiments, the subset of the sub-images comprises all the sub-images.

In some embodiments, the subset of the frames comprises all the frames in the group and the subset of the sub-images comprises all the sub-images and combining the sub-images comprises constructing the image.

In some embodiments, the image comprises a part of a sequence of images encoded by sub-samples of non-overlapping pixels thereof in groups of frames in a video sequence.

In some embodiments, decoding is carried out by using and existing decoder or codec of the art.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a wired or wireless network connection is provided as well. A display and/or a user input device such as a keyboard or mouse or touch-screen or touch-pad are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

In the drawings:

FIG. 1 illustrates an example of a structure of an original image, in accordance with exemplary embodiments of the invention;

FIG. 2A illustrates a sub-image obtained by sub-sampling each odd column in each odd row of the original image of FIG. 1, in accordance with exemplary embodiments of the invention;

FIG. 2B illustrates a sub-image obtained by sub-sampling each even column in each odd row of the original image of FIG. 1, in accordance with exemplary embodiments of the invention;

FIG. 2C illustrates a sub-image obtained by sub-sampling each odd column in each even row of the original image of FIG. 1, in accordance with exemplary embodiments of the invention;

FIG. 2D illustrates a sub-image obtained by sub-sampling each even column in each even row of the original image of FIG. 1, in accordance with exemplary embodiments of the invention;

Figures 1, 2A, 2B, 2C, 2D:
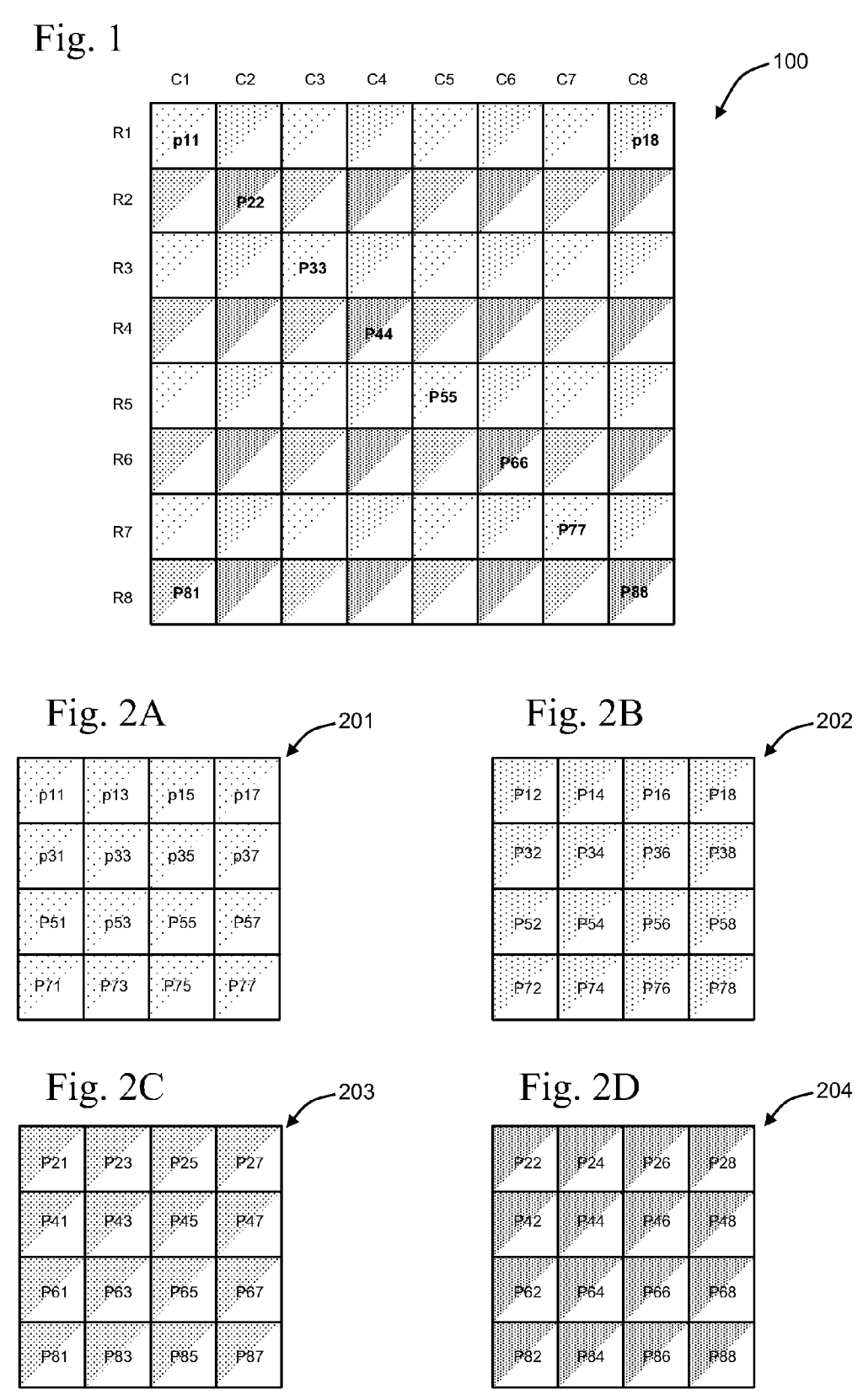
Figure 2E:
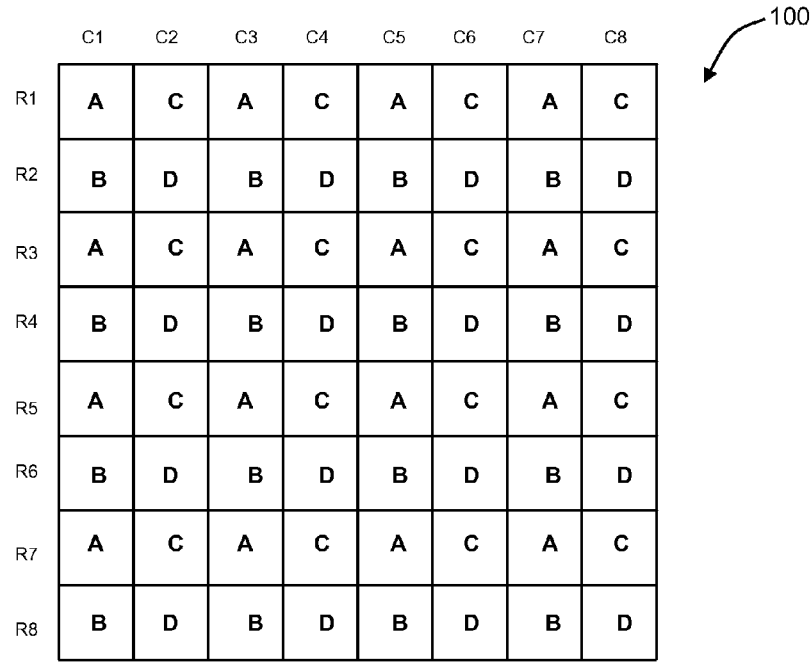
Figure 2F:
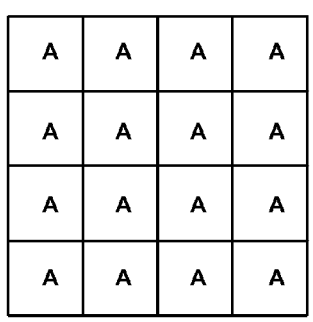
Figure 2G:
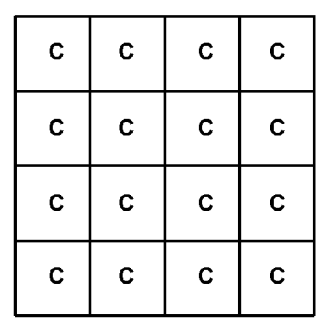
Figure 2H:
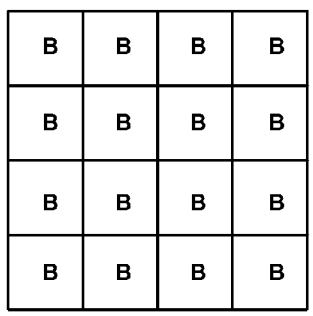
Figure 2I:
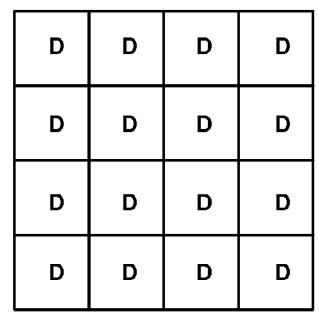
Figure 3A:
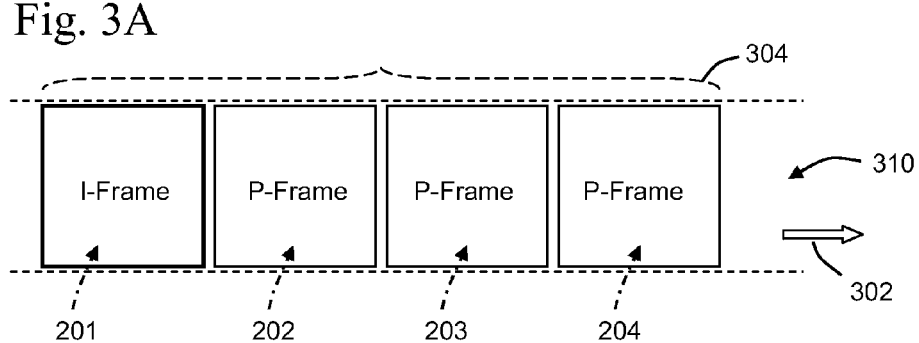
Figure 3B:
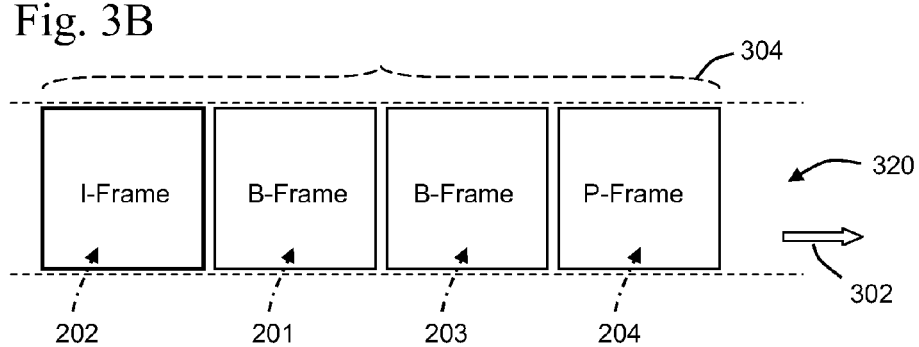
Figure 3C:
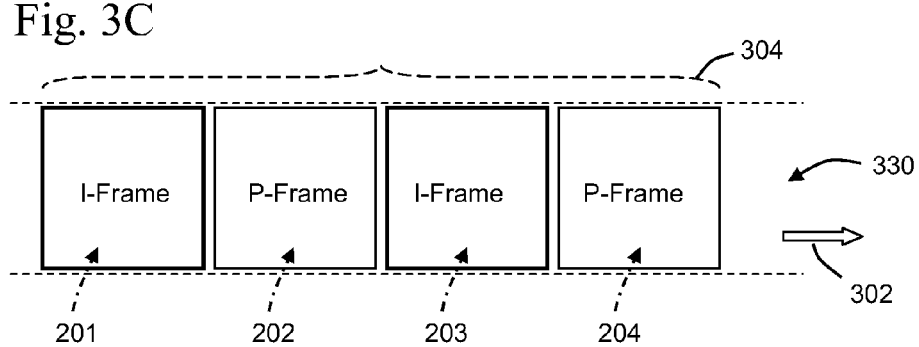
Figure 3D:
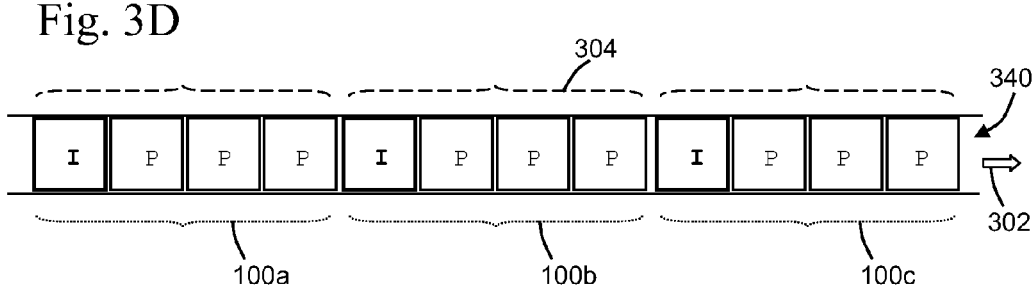
Figure 4A:
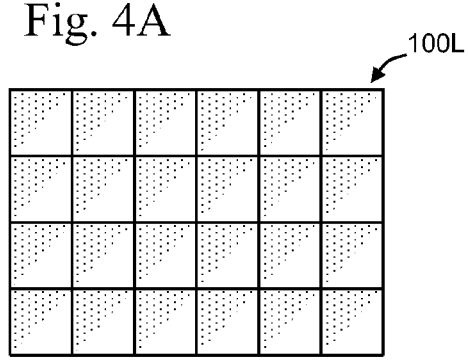
Figure 4B:
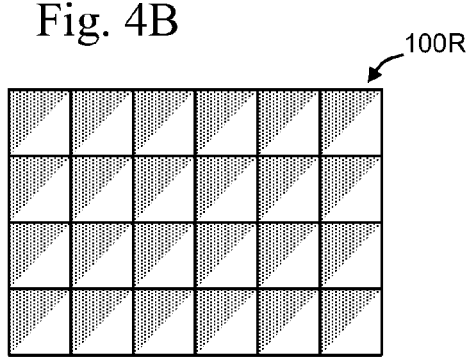
Figure 4C:
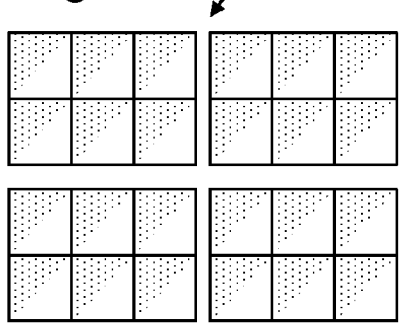
Figure 4D:
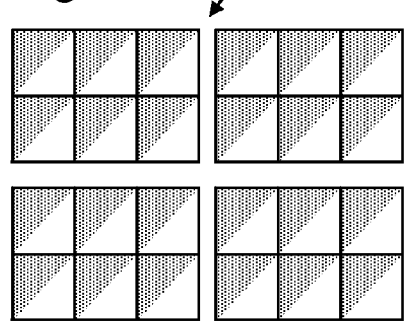
Figure 4E:
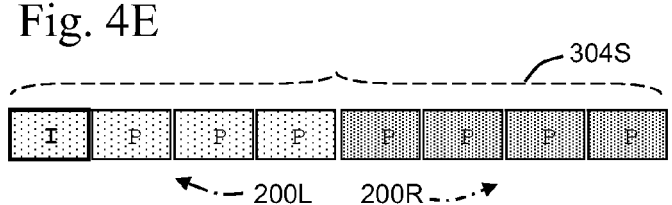
Figure 4F:
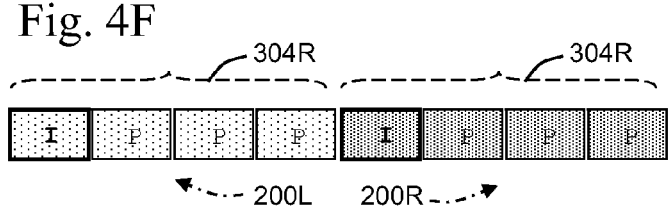
Figure 4G:
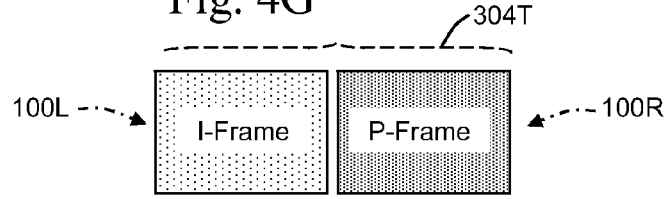
Figure 5A:
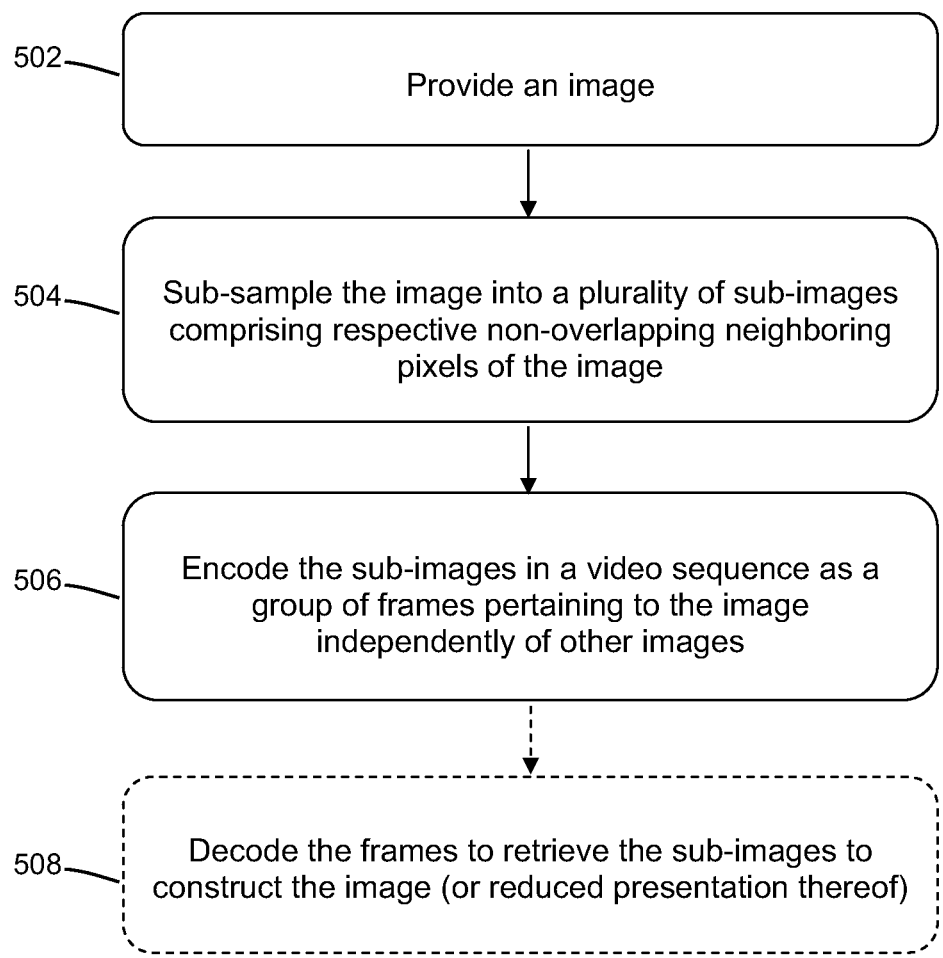
Figure 5B:
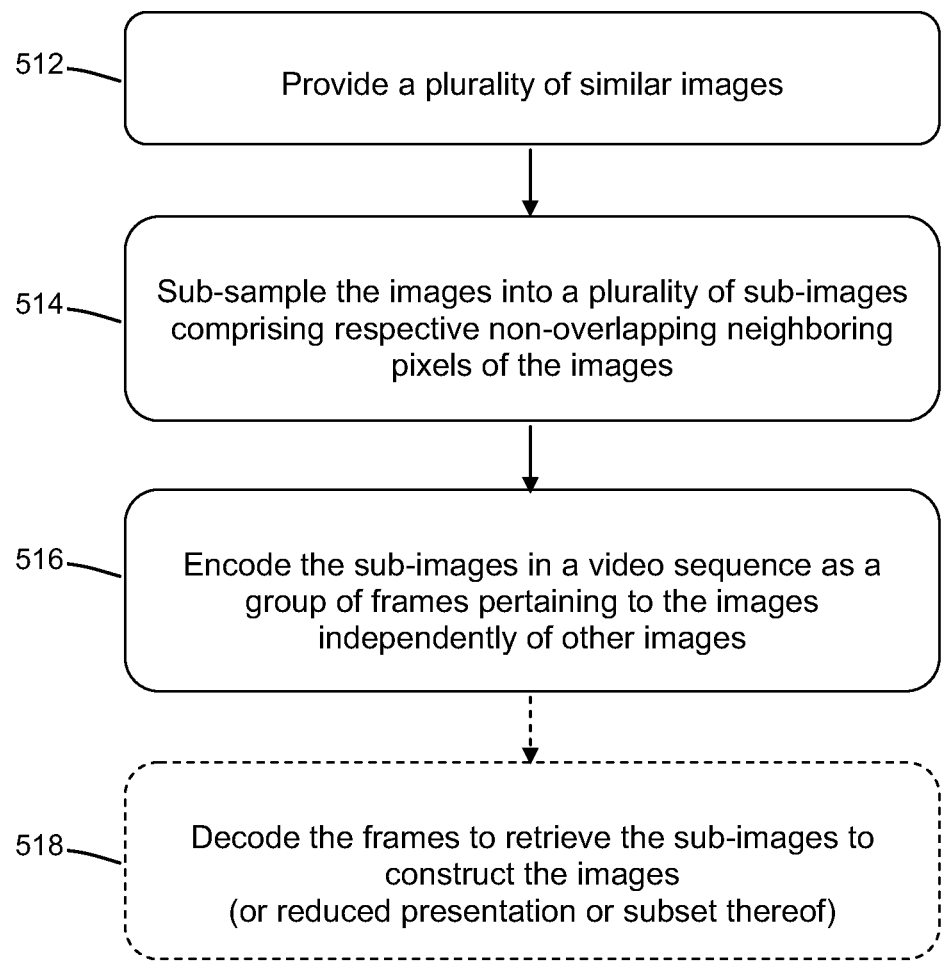
Figure 6C:
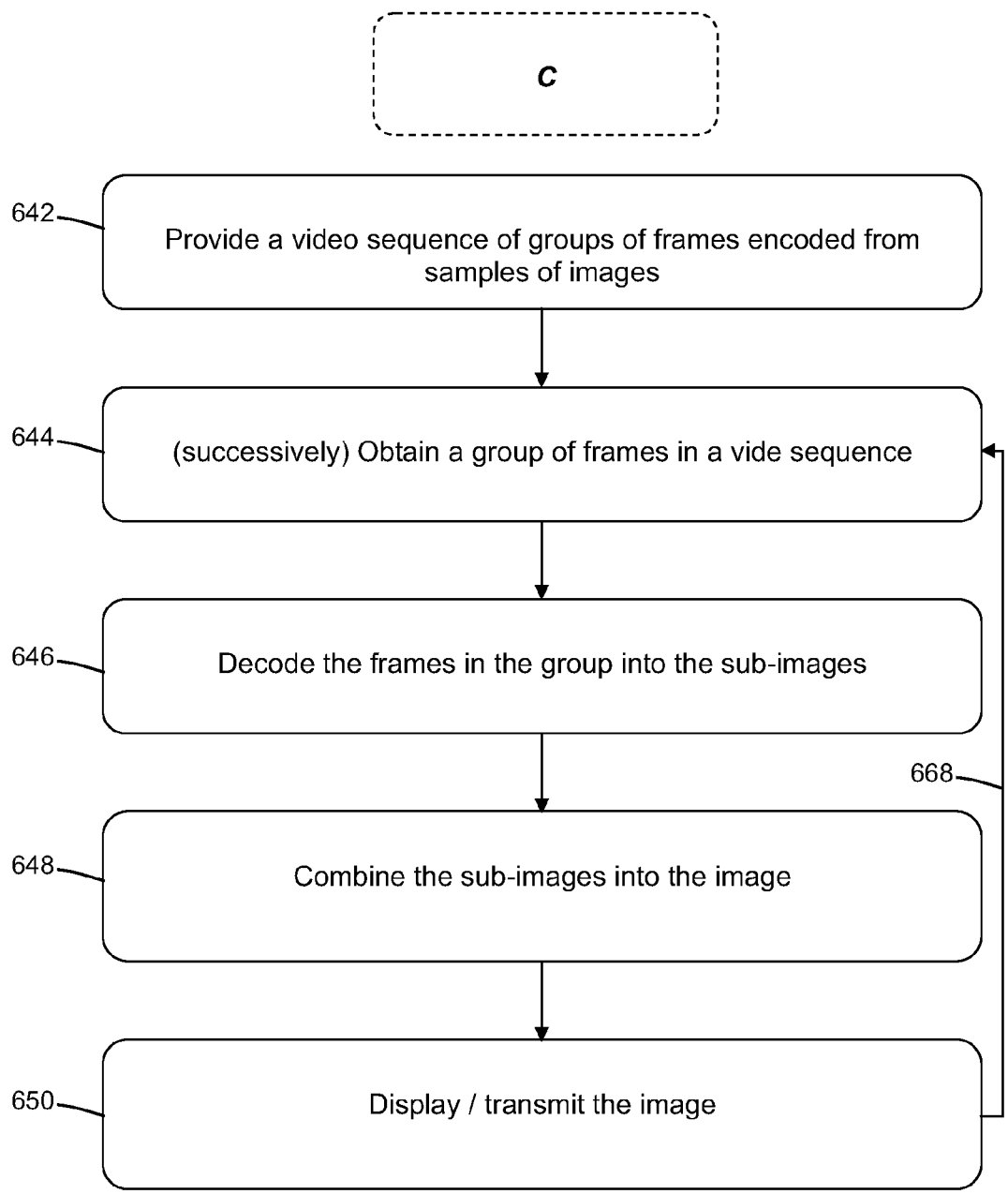
Figure 7:
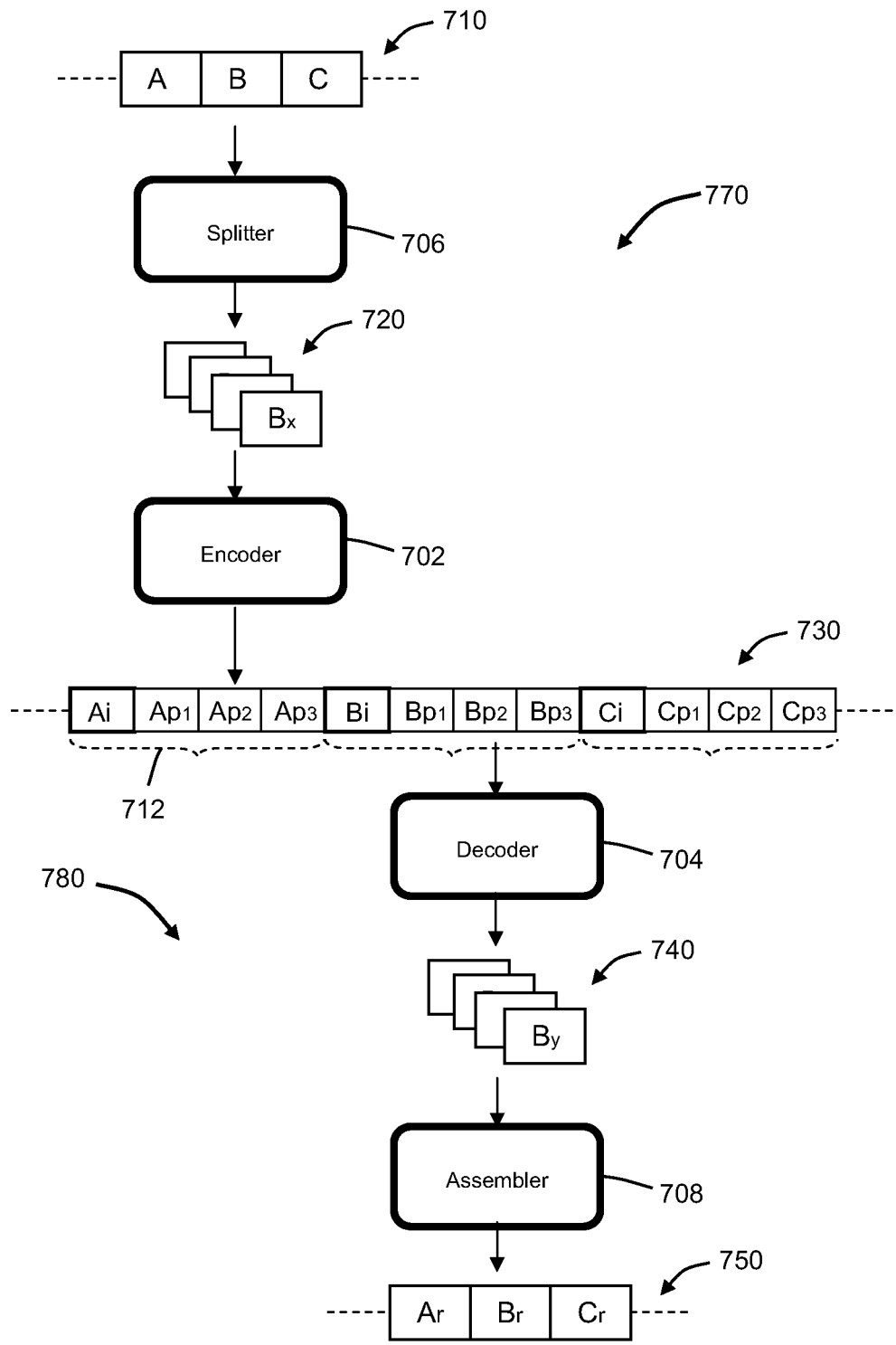
Figure 8A:
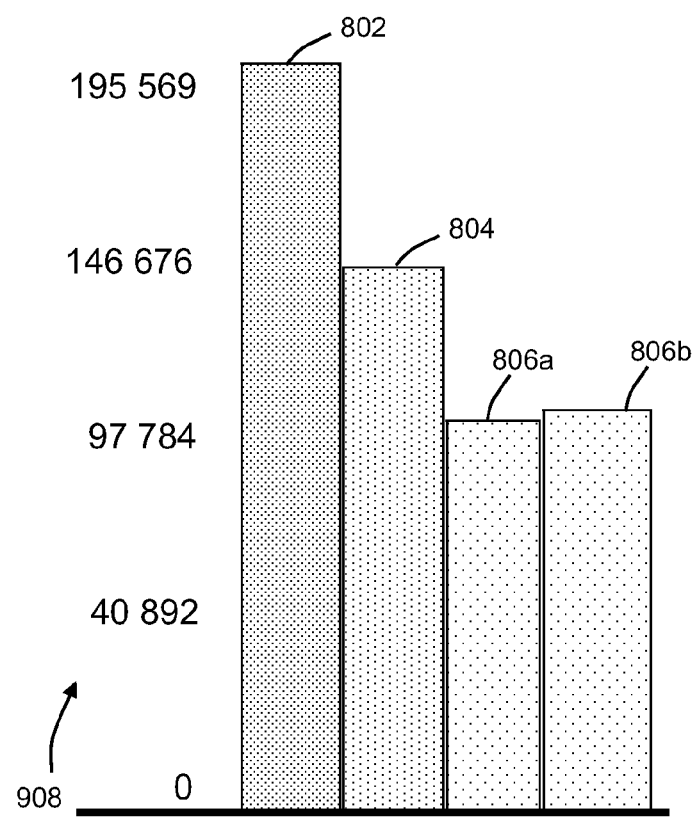
Figure 8B:
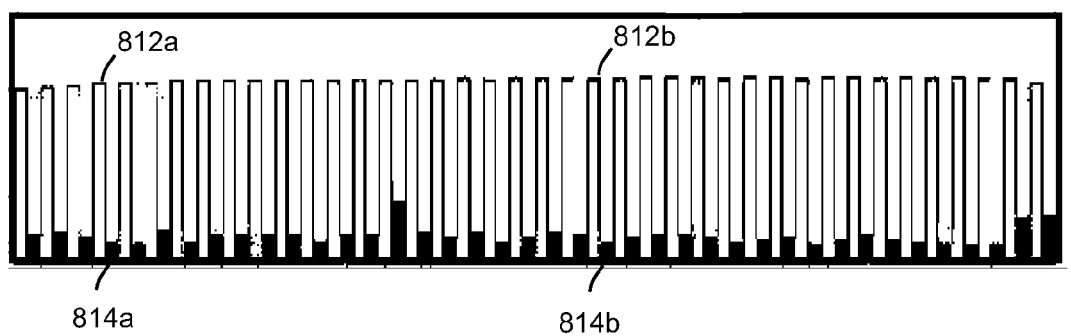

FIG. 2E-I schematically illustrates in a simplified manner the image of FIG. 1 and images of FIG. 2A-D, respectively, in accordance with exemplary embodiments of the invention;

FIG. 3A schematically illustrates sub-images of FIG. 2A-D encoded in a video sequence, in accordance with exemplary embodiments of the invention;

FIG. 3B schematically illustrates a variation of encoding sub-images of FIG. 2A-D in a video sequence, in accordance with exemplary embodiments of the invention;

FIG. 3C schematically illustrates another variation of encoding sub-images of FIG. 2A-D in a video sequence, in accordance with exemplary embodiments of the invention;

FIG. 3D schematically illustrates a groups of sub-images of images encoded in a video sequence, in accordance with exemplary embodiments of the invention;

FIG. 4A schematically illustrates an example of an original image structure of a left view in a stereoscopic representation, in accordance with exemplary embodiments of the invention;

FIG. 4B schematically illustrates an example of an original image structure of a right view in a stereoscopic representation, in accordance with exemplary embodiments of the invention;

FIG. 4C schematically illustrates sub-images obtained by sub-sampling the image of FIG. 4A, in accordance with exemplary embodiments of the invention;

FIG. 4D schematically illustrates sub-images obtained by sub-sampling the image of FIG. 4B, in accordance with exemplary embodiments of the invention;

FIG. 4E schematically illustrates sub-images of the images of FIG. 4A-B encoded in a video sequence as a group, in accordance with exemplary embodiments of the invention;

FIG. 4F schematically illustrates sub-images of the images of FIG. 4A-B encoded in a video sequence as separate groups for images of FIGS. 4A and 4B, in accordance with exemplary embodiments of the invention;

FIG. 4G schematically illustrates images of FIG. 4A-B encoded in a video sequence as a group of two frames, in accordance with exemplary embodiments of the invention;

FIG. 5A is a flowchart outlining operations in encoding in a video sequence sub-images of an image, in accordance with exemplary embodiments of the invention;

FIG. 5B is a flowchart outlining operations in encoding in a video sequence sub-images of a plurality of similar images, in accordance with exemplary embodiments of the invention;

FIG. 6A is a flowchart outlining operations of compression a sequence of images in a video, in accordance with exemplary embodiments of the invention;

FIG. 6B is a flowchart outlining operations of decompression a sequence of frames in a video into representations of images, in accordance with exemplary embodiments of the invention;

FIG. 6C is a flowchart outlining operations of decompression a sequence of frames in a video into images, in accordance with exemplary embodiments of the invention;

FIG. 7 schematically illustrates an apparatus for compression and decompression a sequence of images in accordance with exemplary embodiments of the invention;

FIG. 8A illustrates bit distribution (size) of frames of a compressed image in a video sequence, in accordance with exemplary embodiments of the invention; and FIG. 8B illustrates bit distribution (size) of frames of compressed pairs of stereoscopic images in a video sequence, in accordance with exemplary embodiments of the invention.

DESCRIPTION OF SPECIFIC EMBODIMENTS OF THE INVENTION

The present invention, in some embodiments thereof, relates to image compression and/or reconstruction and, more particularly, but not exclusively, to image compression in a video.

Overview

A general non-limiting overview of practicing the invention is presented below. The overview outlines exemplary practice of embodiments of the invention, devising a basis for variations and/or alternative embodiments, some of which are described below.

Images, and particularly of high definition (of the order of mega-pixels), are generally self-similar in the sense that they contain redundant or approximately redundant contents as the variations within the vicinity of adjacent or neighboring pixels are generally continuous rather than abrupt.

Based on the self-similarity of a typical image, an image may be sampled by selecting a subset of the redundant or approximately redundant pixels to yield a reduced form (lower resolution), or a smaller representation, of the image.

In some embodiments, the image is sampled by selecting subsets of non-overlapping redundant or approximately redundant pixels, yielding a plurality of sub-images where at least a subset thereof is subsequently encoded in a video sequence as frames predicted from at least one frame, preferably, in some embodiments, as one group of pixels (e.g. GOP), independently of other images and/or frames.

Optionally or alternatively, such sub-sampling is used to generate an image which can be used for previewing and which can be compressed and/or reconstructed separately from the rest of the image. Such an image can cover the whole area of the original image or parts thereof.

In some embodiments, an (original) image is sub-sampled by orderly selecting non-overlapping pixels from adjacent or neighboring rows or columns to form a plurality of sub-images having reduced representation of the original image. For example, the sub-sampling is based on orderly selecting non-overlapping pixels from neighboring rows or columns, or groups of rows and/or columns, in the original image, yielding sub-images that may comprise nearly identical or similar contents, having minor or negligible differences therebetween (relative to the general similarity thereof).

In some embodiments the sub-images are all of the same size, i.e. of the same number or rows and columns and/or of the same aspect ratio as the original image. For example, pixels are selected from alternating columns and rows, such as pixels selected from even-numbered columns and even-numbered rows form a sub-image, and pixels selected from odd-numbered columns and even-numbered rows form another image and so forth, forming similar four sub-images having aspect ratio of the original image and size one quarter thereof.

In some embodiments, the sub-images are encoded (and compressed) as video (e.g. file or transmission stream) where one sub-image is encoded as a primary or key frame (Intra frame or I-Frame) and the other sub-images are encoded as intermediate frames (Inter-frames or P-Frames or B-frames) based on prediction from the I-Frame or between two or more frames (e.g. based on an I-Frame and P-Frame). Due to the similarity between the sub-images, the intermediate frames are typically highly compressed (relative to prediction from non-similar frames) comprising merely the minor contents differences relative to the I-Frames (or other frames such a P-Frames) resulting in high compression in general and of the intermediate frames in particular (relative to unrelated frames).

In some preferred embodiments, each frame of the video sequence is Intra-coded, as the sub-images derived from (pertaining to) an image are encoded as one independent group (e.g. group-of-pictures, GOP), independently of other images or frames included or potentially included in the video sequence, allowing to access the particular image or sub-images thereof irrespective of other images or frames.

Multiple/Stereoscopic Images

In some embodiments, a plurality of similar images or having similar portions therebetween are provided, for example multiple images of about the same scene are captured such as by rapid stills fire or video sequence or a pair or pairs of stereoscopic views (or other multi-angle views).

In some embodiments, the images are sampled by selecting corresponding subsets of non-overlapping pixels in the images, yielding a plurality of sub-images where at least a subset thereof is subsequently encoded in a video sequence as frames predicted from at least one frame.

In some embodiments, the plurality of images are sub-sampled and one sub-image is encoded as Intra-Frame and the others as Inter-Frames as described above, providing effective compression of the relatively small differences between the frames.

In some embodiments, an example of multiple images is of a scene is when 3D (stereoscopic) images are provided as a pair of left and right views of a scene, comprising substantial similar regions of the scene therebetween (as the same scene is viewed from two angles). Optionally, one image is used for prediction of the other image, either as a whole image, or in parts.

Based on the similarity between the pair of views, in some embodiments, the images are sub-sampled by rows or columns into a plurality of sub-images and one sub-image is encoded as an Intra-Frame and the others as Inter-Frames, as described above. Due to the similarity between the pair of stereoscopic images, in addition to the similarity between the derived sub-images, the Intra-Frames are exceptionally compressed (relative to prediction of about the same quality from non-similar or unrelated frames), comprising merely the minor contents differences relative to the I-Frames (or other frames such a P-Frames).

Encoding/Decoding Variations

It should be noted that encoding sub-images with one (single) Intra-Frame (I-Frame) as described above is not limiting and in some embodiments a plurality of Intra-Frames is used.

In some embodiments, for example, in encoding images from rapid fire shots when the camera is moving and the similarity between images vary, an I-frame is introduced when similarity between previous images is determined to diminish and subsequent images are determined to be sufficiently similar.

In some embodiments, the similarity between sub-images is determined and based on a similarly threshold or a statistic such as standard deviation the sub-images are grouped and encodes such that each group is preceded by an Intra-Frame followed by Inter-Frames, where each group is arranged as a GOP or all or some of the groups are arranged as a GOP.

In some embodiments, the similarity between images (e.g. rapid fire, video pictures sequence or pairs of stereoscopic images) is determined, and regions that are determined as similar are sub-sampled and encoded as described herein, while, optionally the other regions are encoded as unrelated images (e.g. like pictures of a video). In some embodiments the images are divided to a plurality of tiles and the similarity is determined based on the tiles and similar tiles are sub-sampled and encoded as described herein (see also below). Optionally, a process of identifying tile similarities is carried out to generate a linked list of tiles with neighboring tiles being similar to a certain extent. Optionally, the list is ordered so that similarity between pairs of neighboring tiles is maximized or improved.

In some embodiments, the division into tiles is based on the determined similarity between the images to establish, for example, a large (or largest) portion of sufficient similarity between the images reducing the number of tiles and thereby improving the encoding and/or decoding performance.

In some embodiments, other considerations are used to determine the number and/or position of Intra-Frames, such as subsequent rapid decoding of specific frames, as described below.

It should be noted that encoding the frames pertaining to an image or images in one GOP is not limiting and in some embodiments the frames are encoded as a plurality of GOPs. For example, in some embodiments, each frame of an image, or a subset of frames of an image are stored in separate, typically consecutive, GOPs. As another example, the frames or subset thereof of each image of a pair of stereoscopic representations are stored in separate, typically consecutive, GOPs.

In some embodiments, only a subset of the sub-images is encoded, reducing the file volume and/or allowing faster transmission relative to encoding the entire set of sub-images.

In some embodiments, the encoded sub-images are decoded and combined to produce the original image (or images) by reconstructing the respective rows and columns from the sub-images (inverse sapling).

Decoding a single sub-image (Intra-Frame), or decoding and combining a subset of sub-images (Intra- and Inter-Frames), provide an image similar to the original one but with lower resolution and/or size. Optionally the decoded sub-image or sub-images are processed such as by interpolation or scaling or other methods of the art to provide, according to a particular application, an image of size and/or resolution and aspect ratio sufficiently close to the original one.

Controlling the number of sub-images (or sub-sampling) and the number of encoded frames and the type of respective frames allow to control the size and/or bit rate of the video and/or size and/or visual quality of a resultant image after decoding.

Controlling the number of decoded sub-images allows controlling the size and/or resolution and/or visual quality of the resultant image, as well as allowing progressive reconstruction of the image (increasingly providing higher resolution or size or quality) as more frames are decoded and the respective sub-images are combined with the resultant image.

Due to the similarity between the sub-images and consequential compression level of the intermediate frames described above, or the consequential overall compression level of a GOP, in some embodiments the intermediate frames, as well as optionally the primary (key) frames, are encoded losslessly without quantization, or with minimal quantization variability or without quantization that might reduce the quality of the resultant image, or encoded with lower quantization (relative to unrelated frames) such as to match a required bit rate, avoiding or reducing quantization induced artifacts (e.g. blockiness).

In some embodiments, the original image is pre-conditioned to remove artifacts or noise that might decrease the similarity between neighboring pixels or, additionally or alternatively, the original image is processed to increase the similarity between neighboring pixels, such as by smoothing.

It should be noted that in some preferred embodiments of the invention, the sub-images of an image or images are encoded in a video as if the were consecutive pictures such as captured by a video camera. In some embodiments, an encoder and/or codec of the art is used, encoding the sub-images as sequence of pictures using the encoding apparatus transparently and/or irrespective to the fact that the sub-images are not consecutive pictures where the encoding apparatus applies intra and inter compression according to the capabilities and/or settings of the encoding apparatus.

For example, one sub-image is encoded as an Intra-frame by the encoding apparatus using intra compression as if the sub-image was a first picture in a GOP, and subsequent sub-images are compressed and encoded by the encoding apparatus as Inter-frame or frames by prediction from the Intra-frame (or other Inter-frame) as if they were subsequent pictures in the GOP.

Likewise, in some preferred embodiments of the invention, the encoded video is decoded using a decoder and/or codec of the art as if the video was encoded with a sequence of pictures. For example, the frames are decoded into the sub-images as if they were frames of a video of pictures irrespective of the fact that they are sub-samples on an image.

Preferably, in some embodiments, the sub-images are encoded in and correspondingly decoded from a video structure of the art, e.g. MPEG-1/2/4, DivX, Xvid, AVC, H.264 or VPx, optionally using existing apparatus and/or software. Alternatively or additionally, in some embodiments, a modified and/or custom-made apparatus and/or software is used for encoding and/or decoding the image using a video structure of the art or a variation thereof or custom one.

The original image (or picture of a video or any image to that matter) encoded as described above, is encoded using intra-inter tools, but the result of the coding can be used as if it was coded by a pure intra coding scheme, for example as one independent GOP or other scheme that define the set of frames corresponding to the sub-images of the original image, such that the original frame (or reduced representation thereof) can be decoded and constructed as a unit independently of other images or components thereof included or potentially included in the video sequence.

Terms

A reference to an image herein implies any image, including, without limiting, a still image or a video frame having similar adjacent or neighboring non-overlapping pixels or components thereof (e.g. a color channel), or a plurality of images having similar portions. A reference to an image does not preclude any organization of data elements having similar neighboring values.

As used herein, the term 'neighboring' implies adjacent (abutting) pixels and/or pixels sufficiently close to each other relative to the resolution, such as closer (smaller) than about 1% of the resolution in a respective dimension (rows or columns).

As used herein, similarity between values (e.g. pixels) refers to values differing by small amounts relative to the values, such as two or more values differing by an amount smaller than about 25% of the average thereof.

As used herein, the term 'self-similarity' refers to approximately redundant content between neighboring pixels of an image (akin to similar).

As used herein, the term 'encode' refers to processing and arranging an image as a frame in a video sequence comprising intra- or inter- or inter-intra compression; conversely, the term 'decode' refers to extracting an image from a frame or frames in a video sequence.

As used herein, the term 'quasi-video' refers to a sequence of frames arranged as a video sequence but not, or not necessarily, comprising 'moving' pictures ('movie').

Visual quality herein refers to quantitative measures such as PSNR or SSIM, yet not precluding subjective impression. The terms 'sample' and sub-sample' are used interchangeably denoting selection of pixels from the pixels of an image.

Sub-Sampling

Referring now to the drawings, FIG. 1 illustrates an example of a structure of an original image 100 representing any image structure of any dimensions or aspect ratio, and/or a portion thereof, in accordance with exemplary embodiments of the invention.

For simplicity and clarity, without limiting, image 100 is illustrated as a structure of 8×8 pixels, the rows and columns marked as Rn and Cn respectively with top row and leftmost column numbered as 1. Pixels are denoted as 'prc' where 'r' and 'c' denote the row and column, respectively, and some illustrative pixels are shown in image 100.

As a non-limiting illustrative example, image 100 is sub-sampled into 4 sub-images based on selection of non-overlapping pixels. One such sub-sampling is carried out by selecting pixels of odd columns in odd rows and constructing a sub-image from the selected pixels while following rows and columns order of original image 100, as shown in FIG. 2A that illustrates a sub-image 201 obtained by sub-sampling each odd column in each odd row of original image 100, where pixels of original image 100 are shown in 'prc' notation.

Likewise, image 100 is further sub-sampled into 3 additional sub-images as shown in FIG. 2B-D that illustrate sub-images 202-204 obtained by sub-sampling each even column in each odd row, each odd column in each even row and each even column in each even row of original image 100, respectively. For clarity and further illustration of the sub-sampling and construction of sub-images, the sub-sampled (selected) pixels in original image 100 are shaded, illustrating that whole of image 100 is samples, and corresponding pixels in sub-images 201-204 are indicted with corresponding shades.

For further clarity, FIG. 2E-I schematically illustrates in a simplified manner image 100 of FIG. 1 and images 201-204 of FIG. 2A-D, respectively, in accordance with exemplary embodiments of the invention. The selected pixels in image 100 are indicated by common letters 'A', 'B', 'C' and 'D' with corresponding letters in sub-images 201-204.

In some embodiments, other sampling schemes that span original image entirely are used. For example, sampling the rows/columns by selecting all the pixels in the $n^{th}$ row and column, for example, transversing the image by skipping to the $n^{th}$ column for each $n^{th}$ row). In the example above of image 100 and sub-images 201-204 the factor n is 2 and 4 sub-images are constructed, if n is 3 then 8 ($2^3$) sub-images would be constructed, and so forth. In some embodiments different factors are used for rows and columns, such as m and k for rows and columns, respectively, so that pixels are selected for each $k^{th}$ column for each $m^{th}$ row.

Principally, in some embodiments, the sampling is carried in a wrap-around manner or modulo the number of rows and columns with respect to factor n, provided that n−1 is an integral factor of the number of rows and columns (divides with no remainder where n stands for a factor respective to the rows and columns). Referring to image 100 of FIG. 1 as a non limiting example, example, using columns factor of 3, the selection of columns would be in the order (C3, C6), (C1, C4), (C7, C2), (C5, C8), and using a common factor (for row and columns) of 3 would yield 8 ($2^3$) sub-images such as [p33 p36, p63 p66], [p13 p16, p43 p46], etc., where [x, y] denotes a matrix structure of sub-images.

Encoding in a Video

FIG. 3A schematically illustrates sub-images 201-204 of FIG. 2A-D encoded in a video sequence 310, in accordance with exemplary embodiments of the invention.

In the example of FIG. 3A, sub-image 201 is encoded as a key frame (I-Frame), optionally with intra-compression and/or intra-prediction (possibly implying an additional auxiliary frame) and sub-images 202-204 are encoded as inter-frames predicted from the I-frame (and/or from other inter-inter frames). As each of the sub-images is a reduced presentation of the original image (e.g. image 100) and are approximately identical, any of sub-images 201-204 can be used as a key frame and the rest as intermediate frames (P-Frame or B-Frame). The sub-images on an image (e.g. image 100) are grouped independently of other images or frames as a GOP indicated by bracket 304 and the (temporal) direction is indicated by arrow 302 while the correspondence between sub-images and frames in the video are indicted by dashed-dotted arrows.

It should be noted that referring to Intra-frames or Inter-frames the frames are constructed as known or used in the art. For example, a P-frame is predicted from an I-Frame and for example, a B-Frame is predicted from two or more other frames such as two P-Frames.

FIG. 3B schematically illustrates a variation of encoding sub-images 201-204 of FIG. 2A-D in a video sequence 320, in accordance with exemplary embodiments of the invention. In the example of FIG. 3B, sub-image 202 is encoded as I-Frame, sub-images 201 and 203 as B-Frames and sub-image 204 as P-Frame. The sub-images on an image (e.g. image 100) are grouped independently of other images or frames a as a GOP indicated by bracket 304 and the (temporal) direction is indicated by arrow 302 while the correspondence between sub-images and frames are indicted by dashed-dotted arrows.

FIG. 3C schematically illustrates another variation of encoding sub-images 201-204 of FIG. 2A-D in a video sequence 330, in accordance with exemplary embodiments of the invention, using two I-Frames and two P-Frames. The sub-images of an image (e.g. image 100) are grouped independently of other images or frames as a GOP indicated by bracket 304 and the (temporal) direction is indicated by arrow 302 while the correspondence between sub-images and frames are indicted by dashed-dotted arrows.

FIG. 3D schematically illustrates separate groups (e.g. GOPs) 304 of encoded sub-images of respective images in a video sequence 340, in accordance with exemplary embodiments of the invention. Each group comprises, as an example, one I-Frame (indicated as 'I') and 3 consecutive P-Frames (indicated as 'P'). The correspondence between groups 304 and the respective encoded image such as image 100 is indicated by dotted brackets labeled as 100a, 100b and 100c denoting independently encoded images.

As the sub-images pertaining to an image are grouped together and independently of other frames, the corresponding image can be decoded and constructed irrespective of frames of other images. Additionally, reduced representations of an image (i.e. lower resolution and/or size) can be obtained by decoding an I-frame (or frames), irrespective of other frames of the image or of other images. Furthermore, increasingly detailed (i.e. increased resolution) representations of an image can be progressively obtained by decoding the I-frame, and one or more P-Frames (and/or B-Frames), irrespective of other frames of the image or of other images. As described above the images are intra-coded irrespective of other images.

Encoding Stereoscopic Images

FIGS. 4A and 4B schematically illustrates, respectively, an example of original images structure 100L and 100R of left and right views in a stereoscopic representation. Images 100L and 100R represent, without limiting, any pair of images of any size or aspect ratio that provide stereoscopic representation of a scene. As the images depict views of the generally the same scene, the images are substantially similar, at least in relatively large portions thereof (e.g. at least about 75% of the pixels of each image). Consequently, sub-images thereof obtained by sub-sampling the images as described above are generally similar to each (or at least share similar regions). In some embodiments, the sub-images obtained by sub-sampling the stereoscopic images are encoded in a video as describe above.

FIGS. 4C and 4D schematically illustrates sub-images 200L and 200R obtained as described above by sub-sampling images 100L and 100R, respectively, in accordance with exemplary embodiments of the invention. Sub-images 200L and 200R are illustrated as a set of 4 sub-images (resembling image 100 and sub-images 201-204), yet sub-images 200 represent any number of sub-images derived by any method of selecting non-overlapping pixels from neighboring rows or columns in the original images, some of which were described above.

FIG. 4E schematically illustrates sub-images 200 of the images of FIG. 4A-B encoded in a video sequence as a group indicated by bracket 304S, comprising, for example, one sub-image of 200L encoded as I-Frame and the other sub-images as P-Frames (i.e. predicted from the I-Frame), in accordance with exemplary embodiments of the invention. The encoding scheme as described allows encoding and reconstructing the stereoscopic view as a unit of pair of images, independently of other images or views.

FIG. 4F schematically illustrates sub-images of the images of FIG. 4A-B encoded in a video sequence as groups for left and right views 100L and 100R indicated by respective brackets 304L and 304R, each group comprising, for example, one sub-image 200L and 200R, respectively, encoded as I-Frame and the other sub-images as P-Frames, in accordance with exemplary embodiments of the invention. The encoding scheme as described allows encoding and reconstructing each view independently as one unit, irrespective of other images or views.

In some embodiments, as each images 100L and 100R are substantially similar as described above, one image is encoded as I-Frame and the other as P-Frame predicted from the I-Frame, as exemplified in FIG. 4G that schematically illustrates images 100L and 100R encoded in a video sequence as a group 304T of two frames, one as an I-Frame (100L) and one as a predicted P-Frame (100R), in accordance with exemplary embodiments of the invention.

For clarity and further illustration of the sub-sampling and encoding of frames derived from sampled sub-images, in FIG. 4A-4G the correspondence between original images 100L and 100R or sub-images thereof and corresponding frames is illustrated by corresponding shades, as shown also with respect to FIG. 1 and FIG. 2A-D, and with dash-dotted arrows. In FIG. 4E-G (as well as FIG. 3A-D) the types of frames are indicated as 'I-Frame' or 'I' for Intra-Frames and as 'P-Frame' or 'P' for Inter-Frames.

Alternatively or additionally, in some embodiments, each image of the stereoscopic images is individually encoded by sub-images as described above, irrespective of the other stereoscopic image, for example when the views are insufficiently similar (e.g. viewing a close object).

Sampling Variations

In some embodiments, the sub-images are further sampled. For example, each of sub-images 201-214 of FIG. 2A-D (or FIG. 2-I to that effect) led into two sub-images yielding a total of 8 sub-images (possibly of other aspect ratio), and optionally each of the 8 sub-image is sub-sampled further on. Following the latter reasoning, in some embodiments, the original image is sub-sampled successively or recursively to a certain level or number of sub-images, allowing flexibility in encoding and decoding the image or parts thereof.

In some embodiments, the original image (or images for that matter) is divided into tiles (preferably of same size) which are sub-sampled and encoded as described above. In some embodiments using tiles provides flexibility in decoding portions of the image, optionally progressively enlarging the size (e.g. outwardly from a central region). In some cases or embodiments tiles are used for fitting the frame size as dictated or preferred by a particular codec.

In some embodiments, the sampling interval (e.g. factor) is non-constant for rows and/or columns. For example, the factor is smaller about the center of the image (denser or more detailed sampling) and larger about the margins of the mage (sparser or less detailed sampling). In some embodiments, the interval or factor is multi-valued, e.g. two-valued where one value used for the central region and the other for the peripheral regions, or the intervals vary (by integral quantity) along rows and/or columns, optionally and preferably maintaining sampling the entire image by non-overlapping pixels.

In some embodiments, the sampling is not performed along rows and/or columns, but, rather in a different scheme. For example, zigzag (diagonal) sampling and/or step-wise (e.g. horizontal interval followed by vertical interval), optionally using different intervals as described above.

As another example, in some embodiments, the image is sampled by groups (e.g. consecutive) of rows and/or columns, optionally using smaller groups (e.g. of 1 or 2 rows and/or columns) in the central region of the image and larger groups (e.g. 3 or more rows and/or columns) in the peripheral regions.

As another example, in some embodiments, sub-pixels are sampled such as to provide flexibility in reconstructing the image (or a presentation thereof) after decoding of one or more frames. Optionally or additionally, sub-pixels are sampled in the central region of the image and entire pixels are sampled in peripheral regions. Optionally or additionally, the degree of sampling sub-pixels varies such as finer sub-pixels are sampled in the central region and coarser in the peripheral regions.

Optionally or additionally, the factors and/or sampling scheme are stored in the video such as in order to facilitate proper decoding. For example, the sampling scheme and/or are stored in the header and/or in one or more frames and/or pseudo-frames.

In some embodiments, the pixels of the image, and/or tiles and/or components thereof (see below), is sub-sampled to a plurality of sub-images having different resolutions. For example, the central region and/or tiles in the central region are sampled more densely than peripheral regions and/or tiles thereof, or the Y channel (e.g. luminance) is sampled with higher resolution than the other channels.

In some embodiments, referring herein to central and peripheral regions imply region or regions of interest and other regions, respectively.

In some embodiments, referring herein to pixels, such as in sub-sampling and/or encoding and/or decoding, imply, without limiting, reference to components of the pixels such as color channels and/or auxiliary components such as layers and/or Z ('depth') values, optionally separately of other components. For example, each of the color channel and/or other components and/or subset thereof (e.g. Y or U&V of YUV or R of RGB or Z value) is sampled and encoded separately, optionally in the same or different GOP.

Optionally, in some embodiments, each of the color channel and/or components and/or subset thereof is subsequently decoded separately of the other channels, such as for rapid retrieval of the luminance (grayscale) representation of the image, for example, in rapid reviewing the content of the video (relative to decoding and reconstructing all the channels).

Exemplary Method

FIG. 5A is a flowchart outlining operations in encoding in a video sequence sub-images of an image, in accordance with exemplary embodiments of the invention. An original image is provided (502), such as a still image or a frame of a video.

The image is sub-sampled by selecting subsets of non-overlapping pixels in neighboring rows and columns and the subsets of pixels are constructed or formed or arranged or marked as a plurality of sub-images (504).

The sub-images are encoded in a video sequence as an independent group of frames pertaining to the image, independently of other images or frames thereof that are included or subsequently or potentially included in the sequence (506), or optionally, as consecutive independent groups of pairs.

The sub-images are encoded using a standard (e.g. industry standard) or non-standard encoder (e.g. encoding component of a codec).

Optionally, the sub-images are retrieved by using standard or non-standard decoder (e.g. decoding component of a codec) that restore (reconstruct) the sub-images from their respective frames, and the sub-images are combined to obtain the image (using all the respective frames), or a reduced representation thereof (using a subset of the respective frames), irrespective of other images or parts thereof in the video sequence (508). Optionally, selected sub-images are successively retrieved from the respective frames thereof and successively combined, sequentially increasing the resolution and/or size of the reconstructed image (progressive reconstruction), irrespective of other images or parts thereof in the video.

FIG. 5B is a flowchart outlining operations in encoding in a video sequence sub-images of a plurality of similar images, such as a pair of stereoscopic images, in accordance with exemplary embodiments of the invention.

An original plurality of similar images are provided (512), such as still images or a frames of a video approximately viewing the same scene, or a pair of images for stereoscopic representation (left and right views of the scene).

The images are sub-sampled by selecting subsets of non-overlapping pixels in neighboring rows and columns of the images and the subsets of pixels are constructed into a plurality of sub-images (514).

The sub-images are encoded in a video sequence as a group of frames pertaining to the images, independently of other images or frames thereof that are included or subsequently or potentially included in the sequence (506). Optionally the sub-images pertaining to an image are encoded in a group of frames separately, yet consecutively, with the group of frames pertaining to the other images of the provided plurality of images.

The sub-images are encoded using a standard (e.g. industry standard) or non-standard encoder (e.g. encoding component of a codec).

Optionally, the sub-images are retrieved by using standard or non-standard decoder (e.g. decoding component of a codec) that restore (reconstruct) the sub-images from their respective frames, and the sub-images are combined to obtain the images (using all the respective frames), or only a subset of the images (using the respective frames of the subset of images), or a reduced representation of the images (using a subset of the respective frames), irrespective of other images or parts thereof in the video sequence (518). Optionally, selected sub-images of the images (of one or more or all the images) are successively retrieved from the respective frames thereof and successively combined, sequentially increasing the resolution and/or size of the reconstructed images (progressive reconstruction), irrespective of other images or parts thereof in the video.

It should be noted that although the description above is based on an image structured by rows and columns, in some embodiments the method described above is or can be adapted to other structures of images, such as hexagonal structures akin to honeycomb, where for example, neighboring diagonals and/or rows are sub-sampled.

Video Compression/Decompression

In some embodiments, a sequence of images such as of a video or motion pictures are compressed into a pseudo-video as described above, and decompressed (restored) such as for viewing or editing.

Without limiting, the qualifier 'pseudo' is used to distinguish between a video as a source of image and the video sequence used for compression.

FIG. 6A outlines in flowchart marked as 'A' operations of compression a sequence (series) of images in a pseudo-video, in accordance with exemplary embodiments of the invention.

A sequence of images is provided (602), such as pictures from a video or cinema camera and/or images from animation and/or from a computer and/or from any source.

Each image of picture in the sequence is successively obtained as a separate image (604) and is sub-sampled into sub-images as described above (606).

The sub-images are encoded, i.e. compressed, as frames predicted from at least one frame as described above (608), for example, an Intra-Frame followed by Inter-Frames.

In some embodiments, a subset of the sub-images are encoded as frames, where optionally only one sub-image is encoded (e.g. as an I-Frame) or, alternatively, all the sub-images are encoded as a sequence of frames. The encoded frames are arranged as an independent group (e.g. GOP), independently of other frames or groups (610). In some embodiments or cases, such as according to the encoding process, encoding (608) and arranging (610) are combined as illustrated by bracket 664.

The group of frames is stored in a file such as a pseudo-video file or transmitted to other location (612), for example, for subsequent viewing as described above and below with respect to FIGS. 6B and/or 6C, and the cycle is repeated as indicated by arrow 662, until the end of the sequence (or other termination indication or signal). The 'B/C' marking indicates optional further decompression processes, as described below.

In some preferred embodiments, information regarding the relation of the encoded sub-images are stored (and/or transmitted) in the pseudo-video sequence, such as in the header of the sequence and/or in pseudo frames and/or in the groups of frames (e.g. the Intra-Frame).

It should be noted that in some preferred embodiments of the invention, an existing encoder (or codec) of the art is used for encoding (compressing) the sub-images, where, in some cases the encoder parameters are set to encode and arrange the sub-images as frames predicted from at least one frame. In some embodiments, a program executable by a processor and/or electronic circuitry is used for splitting (sub-sampling) the image into sub-images.

FIG. 6B outlines in flowchart marked as 'B' operations of decompression a sequence of images in a pseudo-video into representations of images, in accordance with exemplary embodiments of the invention.

A pseudo-video sequence of groups of frames encoded from a subset of sub-sub-samples of images, as described above such as in 'A' of FIG. 6A, is provided (622).

Each group of frames in the pseudo-video sequence is successively obtained (624) and the frames are decoded (decompressed, restored) into sub-samples of an image (626).

The sub-images are combined to construct a part or representation of the image (628). Since only a subset of the sub-images were encoded in the group of frames, the image is constructed as a reduced representation (e.g. lower resolution relative to the original image) and/or the sub-images and/or the reduced representation are process such as by scaling and/or interpolation to achieve a close representation of the image.

In some embodiments, data stored in the pseudo-video or in pseudo-frames or other frames are used to combine the sub-images with proper relation to the original image.

The reconstructed image is provided and, in some embodiments and/or cases, is used to display and/or transmit the representation or part of the original image such as for reviewing (630).

The cycle is repeated as indicated by arrow 666, until the end of the sequence (or other termination indication or signal).

It should be noted that in some preferred embodiments of the invention, an existing decoder (or codec) of the art is used for decoding (decompressing) the frames, and in some embodiments, a program executable by a processor and/or electronic circuitry is used for splitting (sub-sampling) the image into sub-images.

FIG. 6C outlines in flowchart marked as 'C' operations of decompression a sequence of images in a pseudo-video into the original images in case of lossless compression, or close approximation thereof in case of lossy and/or quantized compression, in accordance with exemplary embodiments of the invention.

A pseudo-video sequence of groups of frames encoded from all the sub-sub-samples of images, as described above such as in 'A' of FIG. 6A, is provided (642).

Each group of frames in the pseudo-video sequence is successively obtained (644) and the frames are decoded (decompressed, restored) into sub-samples of an image (646).

The sub-images are combined to construct the original image (628). Since all the sub-images were encoded in the group of frames, the image is constructed to the original contents and structure thereof (in case of lossless compression), or to a close approximation of the contents and/or structure thereof (in case of lossy compression) (648).

In some embodiments, although all the sub-images of the image were encoded, yet only a subset of the sub-images are restored and/or used to construct a part or representation of the image, as described, for example, above with respect to FIG. 6B (e.g. 628).

The reconstructed image is provided and, in some embodiments and/or cases, is used to display and/or transmit the representation or part of the original image such as for reviewing (650).

The cycle is repeated as indicated by arrow 668, until the end of the sequence (or other termination indication or signal).

It should be noted that in some preferred embodiments of the invention, an existing decoder (or codec) of the art is used for decoding (decompressing) the frames, and in some embodiments, a program executable by a processor and/or electronic circuitry is used for assembling (combining) the decoded (or restored) sub-images to construct the image or part thereof.

Apparatus

FIG. 7 schematically illustrates an apparatus 770 for compression and apparatus 780 for decompression a sequence of images in accordance with exemplary embodiments of the invention.

Apparatus 770 comprises a splitter 706 and an encoder 702, optionally combined or coordinated together.

Splitter 706 accesses a sequence 710 of images (e.g. video or motion pictures), shown as illustrative images 'A', 'B' and 'C', and successively splits each image into sub-images 720 shown as illustrative sub-images 'Bx', and feeds sub-images 720 to encoder 702. Encoder 702 encodes (compresses) sub-images 720 as a group 712 of frames in a video sequence 730. To illustrate the relation of the frames to the images, for the illustrative images such 'A' are shown frames as $A_k$, where k represents the type of frames such as I-Frame or P-Frame (as a non-limiting example).

Apparatus 780 comprises a decoder 704 and an assembler 706, optionally combined or coordinated together.

Decoder 704 access a video sequence 730 produced by apparatus 770 and/or a compatible one, and decodes (decompresses) frames of groups 712 into sub-images 740, shown as illustrative sub-images 'By'. In some embodiments, 'By' are equivalent to 'Bx', while in some embodiments, sub-images 'By' differ from 'Bx' due to lossy compression.

Sub-images 740 are fed into assembler 708 which assembles (combines) sub-images 740 to reconstruct sequence 750 of images respective to images of sequence 710, shown as 'Ar' 'Br' and 'Cr' respective to images 'A', 'B' and 'C' of sequence 710, where the subscript r denotes a restored image. In some embodiments the restored images of sequence 750 are equivalent to the original images of sequence 710, while in some embodiments the restored images are differ from the original images due to lossy compression.

In some embodiments, splitter 706 and/or assembler 708 are implemented as software executable by a processor, optionally aided by dedicated and/or general purpose hardware and/of firmware. Optionally or alternatively, splitter 706 and/or assembler 708 are implemented in hardware or firmware such as ASIC and/or any method of the software and/or electronics art.

In some embodiments, encoder 702 and decoder 704 are combined in a codec such a codec of the art. In some embodiments, encoder 702 and/or decoder 704 (or any combinations thereof) are implemented as software and/or firmware and/or any method of the software and/or electronics art.

In some embodiments, apparatus 770 and/or 780 implements a method and/or methods as described above.

Exemplary Results

FIG. 8A illustrates bit distribution (size) of frames of a compressed image in a video sequence, in accordance with exemplary embodiments of the invention.

An HD frame image of 1920×1080 was sub-sampled into 4 sub-images of 960×540 pixels each, and encoded in a video sequence the four frames as a GOP arranged as one I-Frame 802, one P-Frame 804 and two B-Frames 806, where the values 808 provide order of magnitude of the number of bytes.

The total size is about 30% smaller than a encoding with ProRes or DNxHD codecs providing about the same quality.

FIG. 8B illustrates bit distribution (size) of frames of compressed pairs of stereoscopic images in a video sequence using H.264 scheme, in accordance with exemplary embodiments of the invention. One view (e.g. left view) is encoded as an I-Frame 812 and the other view (e.g. right view) as a P-Frame 814. The efficiency of encoding is larger than using regular H.264 scheme (as if the images are not related) and the predicted frames are about 20%-40% smaller than the respective I-Frames.

Movie Making

In some embodiments the encoding (compression) and decoding (decompression) as described above are employed in movie making and reviewing and/or viewing.

In some embodiments, movie making comprises:
(a) put up at least one camera;
(b) capture the scene in as a sequence of images in the at least one camera;
(c) compress the images in a video as groups of frames of sub-samples of the images (at the camera or at a remote location); and
(d) store the video (e.g. on a server) and/or transmit the video for possible viewing (as described above and/or below).

In some embodiments, compressing comprises compressing a subset of the samples of the images.

In some embodiments, the compression apparatus is comprised in and/or linked with and/or coupled to the at least one cameras, thereby optionally compressing the movie concurrently with and/or subsequently to the movie capture in the camera and/or a device connected with the camera.

In some embodiments, movie viewing and/or reviewing comprises:
(a) access a video formed as described above and/or or equivalent thereof;
(b) decompress images in groups of frames; and
(c) view the images (optionally for editing or shot selection purposes).

In some embodiments, decompressing comprises rapidly decoding only Intra-Frames of an image for reviewing the movie or part thereof. In some embodiments, decompressing comprises rapidly decoding only a subset of the frames of an image. In some embodiments, decompressing comprises decoding all the frames of an image to restore the original image.

Potential Advantages/Benefits

Some potential advantages and benefits of some embodiments of the invention, one or more of which may be realized, include:

Frame independent compression (allowing editing of particular frames independent on other frames), optionally during filming and/or providing sequence of images from a computer (such as in animation)

Efficient compression of very high quality relative to compressions of the art, such as about 40% or better compared to ProRes DNxHD and about 20%-30% or better compared to AVC Intra, under the same and/or equivalent and/or approximate conditions.

Support for various color formats including without limiting RGB, YUV, 4:2:2 and 4:4:4 or 10/12, for example, compressing the layers separately and/or predicting form one layer to the other.

Fast decompression of reduced resolution (a fraction of the image such as ¼ or ⅛ of the original image), optionally with same area coverage, or with reduced coverage.

Wide band or fast transmission relative to compression schemes of the art, for example, as compression is better and/or as only I-frames are transmitted.

Enabling a lossless transmission over limited bandwidth due to the images similarity that allow pre design of fast partitioning with exact fit of the required bit size without having to quantize individual frames to fit the required bit size.

GENERAL

It is expected that during the life of a patent maturing from this application many relevant compressions and video encoding and/or decoding methods will be developed and the scope of the term compression and video encoding and/or decoding is intended to include all such new technologies a priori.

As used herein the term "about" refers to ±10% of a referenced quantity of amount.

The terms "comprises", "comprising", "includes", "including", "having" and their conjugates mean "including but not limited to".

As used herein, the singular form "a", "an" and "the" include plural references unless the context clearly dictates otherwise. For example, the term "an image" or "at least one image" may include a plurality of images, including combinations thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such smaller than 25% should be considered to have specifically disclosed any value smaller than 25% of the referenced amount.

As used herein the term "method" refers to manners, means, techniques and procedures for accomplishing a given task including, but not limited to, those manners, means, techniques and procedures either known to, or readily developed from known manners, means, techniques and procedures by practitioners of the image processing and video encoding/decoding arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for encoding an image data, comprising:
    (a) receiving an image having a plurality of pixels;
    (b) selecting a plurality of subsets of non-overlapping pixels from the plurality of pixels, yielding a plurality of sub-images of the image; and
    (c) encoding the plurality of sub-images as a plurality of frames in a video sequence;
    wherein an area coverage of each of the plurality of sub-images and the image is similar;
    wherein a plurality of neighboring pixels of a certain pixel of the plurality of pixels in one of the plurality of subsets are sampled to at least two other subsets of said plurality of subsets, said plurality of neighboring pixels are sampled from at least one column and at least one row which are neighboring to the certain pixel.

2. The method according to claim 1, wherein selecting the plurality of subsets of non-overlapping pixels totals to selecting the pixels of the entire image.

3. The method according to claim 1, wherein the video sequence is predicted from at least one frame.

4. The method according to claim 3, wherein predicted from at least one frame comprises predicted from one at least one Intra frame.

5. The method according to claim 1, wherein encoding the sub-images in a video sequence comprises encoding the plurality of sub-images in an independent group of frames independently of other images that are included or subsequently or potentially included in the sequence.

6. The method according to claim 1, wherein the video sequence is structured according to a video structure used in the art.

7. The method according to claim 1, wherein encoding the plurality of sub-images in a video sequence comprises using an existing video encoder or codec.

8. The method according to claim 1, wherein encoding the plurality of sub-images in a video sequence comprises encoding the plurality of sub-images in an independent group of frames, allowing the image to be restored, at least partially, by decoding frames corresponding to the plurality of sub-images of the image, irrespective of other images that are included or subsequently included in the sequence.

9. The method according to claim 1, wherein encoding the plurality of sub-images in a video sequence comprises encoding the plurality of sub-images in an independent group of frames, allowing a reduced form of the image to be restored by decoding one frame corresponding a sub-image of the image, irrespective of other images that are included or subsequently included in the sequence.

10. The method according to claim 1, wherein encoding the plurality of sub-images in a video sequence comprises encoding the plurality of sub-images in an independent group of frames, allowing decoding the frames by an existing decoder or codec.

11. A method for encoding an image having rows and columns, comprising:
    (a) providing an image;
    (b) sub-sampling the image into a plurality of sub-images by selecting a plurality of subsets so that each pixel from a certain pixel of said row and column of pixels in the image is sub sampled to a different subset from its neighboring pixels in at least one neighboring row of pixels and at least one neighboring column of pixels in the image; and
    (c) encoding at least a subset of the plurality of sub-images as a plurality of frames of a video sequence;
    (d) presenting the video sequence;
    wherein an area coverage of each of the plurality of sub-images and the image is similar.

12. The method according to claim 11, wherein the plurality of subsets includes non-overlapping pixels which totals to selecting the pixels of the entire image.

13. The method according to claim 11, wherein said subset comprises all the plurality of sub-images, said encoding comprises encoding said plurality of sub-images as a plurality of frames.

14. The method according to claim 11, wherein the video sequence is predicted from at least one frame.

15. The method according to claim 14, wherein predicted from at least one frame comprises predicted from at least an Intra-Frame.

16. The method according to claim 11, wherein encoding the plurality of sub-images in a video sequence comprises encoding sub-images in an independent group of frames independently of other images that are included or subsequently or potentially included in the sequence.

17. The method according to claim 11, wherein sub-sampling comprises selecting each $n^{th}$ pixel in each $n^{th}$ row, where n is an integer such that n−1 is an integral factor of the number of rows and columns.

18. The method according to claim 11, wherein sub-sampling comprises selecting each $k^{th}$ pixel in each $m^{th}$ row, where m and k are integers such that m−1 and k−1 are integral factor of the number of rows and columns, respectively.

19. The method according to claim 11, wherein the video sequence is structured according to any video structure used in the art.

20. The method according to claim 11, wherein encoding the plurality of sub-images in a video sequence comprises using an existing encoder or codec.

21. The method according to claim 11, wherein encoding the plurality of sub-images in a video sequence comprises encoding the plurality of sub-images in an independent group of frames, allowing the image to be restored the frames corresponding to the plurality of sub-images of the image, irrespective of other images that are included or subsequently included in the sequence.

22. The method according to claim 11, wherein encoding the plurality of sub-images in a video sequence comprises encoding the plurality of sub-images in an independent group of frames, allowing the image to be restored progressively by successively decoding frames corresponding to the plurality of sub-images of the image, irrespective of other images that are included or subsequently included in the sequence.

23. The method according to claim 11, wherein encoding the plurality of sub-images in a video sequence comprises encoding the plurality of sub-images in an independent group of frames, allowing a portion of the image to be restored by decoding a subset of the frames corresponding to the plurality of sub-images of the image, irrespective of other images that are included or subsequently included in the sequence.

24. The method according to claim 11, wherein encoding the plurality of sub-images in a video sequence comprises encoding the plurality of sub-images in an independent group of frames, allowing a portion of the image to be restored by decoding one of the frames corresponding to the plurality of sub-images of the image, irrespective of other images that are included or subsequently included in the sequence.

25. The method according to claim 11, wherein encoding the plurality of sub-images in a video sequence comprises encoding the plurality of sub-images in an independent group of frames, allowing decoding the frames by an existing decoder or codec.

26. A method for compressing a plurality of images having a relative large similar portions therebetween, comprising:
(a) providing the plurality of images;
(b) selecting a plurality of subsets of non-overlapping pixels in the plurality of images, yielding a plurality of sub-images of the plurality of images, each of the plurality of subsets is selected from pixels of another of the plurality of images, first pixels of a first the subset are selected from a certain image of the plurality of images and second pixels of a second the subset are selected from a subsequent image of the plurality of images so that the first and second pixels do not overlap in position; and
(c) encoding at least one of the plurality of sub-images as a plurality of frames in a video sequence;
wherein the plurality of images and the plurality of sub-images having a common area coverage.

27. The method according to claim 26, wherein the video sequence is predicted from at least one frame of said plurality of frames.

28. The method according to claim 26, selecting subsets of non-overlapping corresponding pixels in the plurality of images totals to selecting the pixels of the entire images.

29. The method according to claim 26, wherein encoding the plurality of sub-images in a video sequence comprises encoding the plurality of sub-images in an independent group of frames, independently of other images that are included or subsequently or potentially included in the sequence.

30. The method according to claim 26, wherein encoding the plurality of sub-images in a video sequence comprises encoding sub-images selected from one or more of the plurality of images in an independent group of frames, independently of other images that are included or subsequently or potentially included in the sequence.

31. The method according to claim 26, wherein encoding the plurality of sub-images in a video sequence comprises encoding the plurality of sub-images selected from each image in an independent group of frames, independently of other images that are included or subsequently or potentially included in the sequence.

32. The method according to claim 26, wherein the video sequence conforms to a video structure used in the art.

33. The method according to claim 26, wherein encoding sub-images in a video sequence comprises using an existing encoder or codec.

34. The method according to claim 26, wherein encoding sub-images selected from the plurality of images in a video sequence is such that the images can be restored, at least partially, by decoding frames corresponding to the plurality of sub-images of the plurality of images, irrespective of other images that are included or subsequently included in the sequence.

35. The method according to claim 34, wherein decoding the frames comprises using an existing decoder or codec.

36. The method according to claim 26, wherein the plurality of images comprises at least one pair of images of stereoscopic presentation of a scene.

37. An apparatus for compressing and decompressing an image, comprising:
(a) a splitter configured to sub-sample an image having a plurality of pixels into a plurality of sub-images comprising a plurality of subsets of non-overlapping pixels of the image; and
(b) an encoder configured to encode at least one of the plurality of sub-images in a video sequence as at least one frame of a plurality of frames in a video sequence; and
wherein an area coverage of each of the plurality of sub-images and the image is similar;
wherein a plurality of neighboring pixels of a certain pixel of the plurality of pixels in one of the plurality of subsets are sampled to at least two other subsets of said plurality of subsets, said plurality of neighboring pixels are sampled from at least one column and at least one row which are neighboring to the certain pixel.

38. The apparatus according to claim 37, wherein the splitter is coupled to the encoder.

39. The apparatus according to claim 37, further comprises a decoder configured to decode the encoded frames thereby restoring the sub-images, at least partially, and an assembler configured to combine the sub-images to construct the image, at least partially; wherein the assembler is coupled to the decoder.

40. The apparatus according to claim 37, wherein encoding comprises encoding according to a video structure used in the art.

41. The apparatus according to claim 37, wherein configured comprises at least one of electronic circuitry or a program executable by a processor.

42. The apparatus according to claim 37, wherein at least one of the encoder or decoder are existing apparatus of the art.

43. The method according to claim 1, wherein the image comprises a part of a sequence of images encoded by sub-samples of non-overlapping pixels thereof in groups of frames in a video sequence.

44. The method according to claim 1, wherein decoding is carried out by using and existing decoder or codec of the art.

45. The method according to claim 1, wherein the plurality of sub-images are four sub-images.

46. The method according to claim 1, wherein said four sub-images having aspect ratio of the image and a size one quarter thereof.

47. The method according to claim 1, further comprising displaying said video sequence as a preview of said image.

48. The method according to claim 1, wherein said encoding comprises encoding said plurality of sub-images as a plurality of frames of the video sequence further comprising sequentially transmitting said plurality of frames for progressive reconstruction of said image.

* * * * *